S. T. KELLOGG.
MOTOR CYCLE GUN MOUNT.
APPLICATION FILED MAY 22, 1917.

1,234,172.

Patented July 24, 1917.
2 SHEETS—SHEET 1.

UNITED STATES PATENT OFFICE.

STANLEY T. KELLOGG, OF BRIDGEPORT, CONNECTICUT.

MOTOR-CYCLE GUN-MOUNT.

1,234,172.  Specification of Letters Patent.  Patented July 24, 1917.

Application filed May 22, 1917. Serial No. 170,319.

*To all whom it may concern:*

Be it known that STANLEY T. KELLOGG, a citizen of the United States, and resident of Bridgeport, in the county of Fairfield and State of Connecticut, has invented certain new and useful Improvements in Motor-Cycle Gun-Mounts, of which the following is a specification.

My invention relates to new and useful improvements in motor cycle gun mounts for machine guns.

The purpose of the invention is to provide a special form of gun mount for machine guns of small caliber which may be mounted upon and operated from a platform supported upon the common form of side car chassis of motorcycles, and without the necessity of making any change whatever in the construction of either the motorcycle, the side car, frame or mechanism carrying the same. Further to design the gun mount so that it may be operated by a person carried upon the side chassis and entirely independent of the man operating the motorcycle, and particularly to design and construct the gun mount so that it may be adjustable to various angles and likewise for firing it in either a forward, sidewise, rearward or any intermediate directions with respect to the motorcycle.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Figure 1:
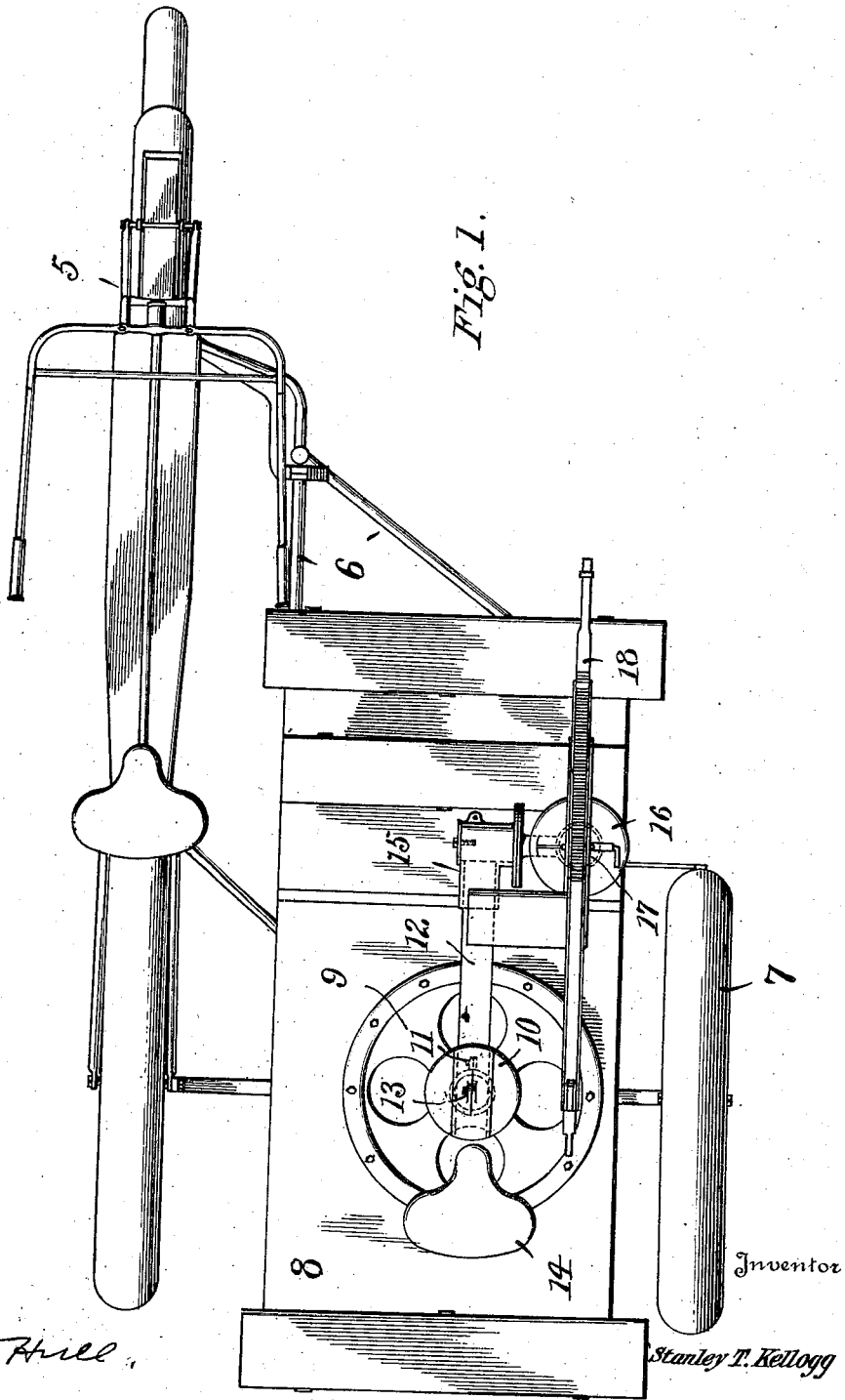

Similar characters of reference denote like or corresponding parts throughout the several figures of the accompanying drawings forming a part of this specification, and upon which, Figure 1 shows a top plan view of a motorcycle having a side car chassis attachment, and with my improved form of gun mount supported thereon, the gun carried by the mount being pointed in a forward direction.

Figure 2:
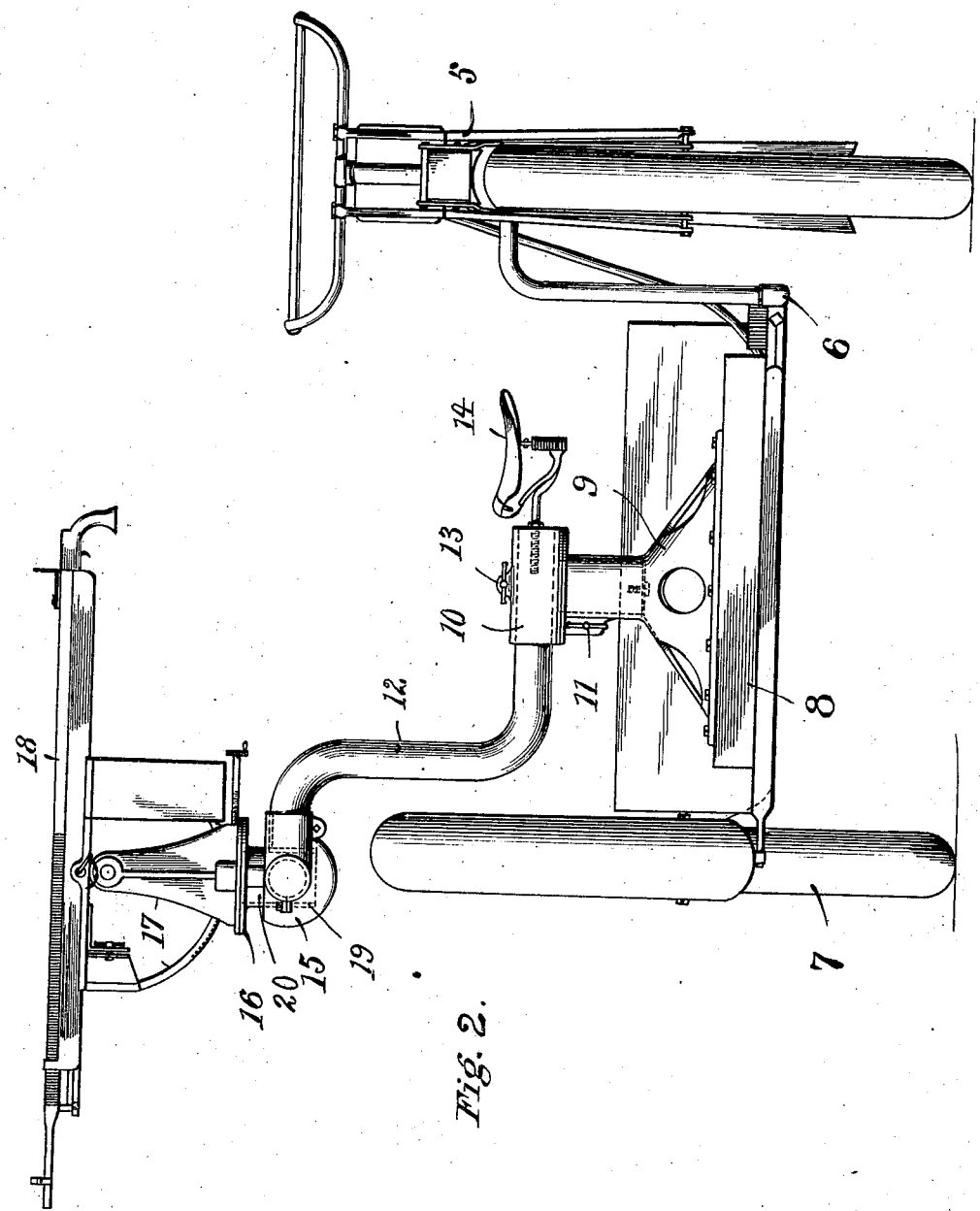

Fig. 2 is a front elevation upon a slightly enlarged scale of the construction shown in Fig. 1 the gun mount, however, being swung around at a right angle to that shown in Fig. 1 with the gun pointed over the wheel of the side frame attachment.

Referring in detail to the characters of reference 5 represents a motorcycle which may be of any of the well known commercial types and 6 the side car frame attached thereto and further supported by the side wheel 7. This side car chassis including the axle, wheel, &c., like the motorcycle proper, may be of any of the commercial forms such as is employed for supporting a side body, but which for my purpose is removed and the floor or platform 8 shown upon this frame in the present drawings, substituted.

I provide a special form of pedestal 9 which is secured to the floor 8 and is mounted substantially over the line of the axle of the rear wheels of the motorcycle and side car chassis. In this pedestal is formed a socket to receive the pivot of a block 10 that is adapted to turn upon and in the support and may be secured in any desired position by means of the clamping screw 11. A bent arm 12 is mounted in and adapted to be adjusted horizontally in this block and secured in position by the clamping screw 13. This arm is detachably secured in the said block and is crooked and disposed upward and outward to clear the side wheel when the arm and gun is swung around from a front or rear to a sidewise position. The particular formation of this arm is important, since it gives room for the manipulation of the gun by the gunner as well as plenty of foot room.

A seat 14 is secured to the lower end of the arm 12 and is positioned in line with the same and the pedestal so as to be adjusted to and from the pedestal with the adjustment of the arm in the block.

Upon the outer end of this arm is mounted a double swivel 15 having a socket 19 to receive the pivot 20 of a table 16 and whereby the latter may be adjusted to various positions as occasion may require. The sockets in the pedestal and swivel are the same size so as to permit the table of the segment to be detached and set directly into the socket of the pedestal, if desired, for shipment or while traveling over the road. In this case the arm would be disconnected and packed upon the platform. Upon this table is supported the gun segment 17 which carries the gun 18 which may be of a standard government type with means for adjusting it and elevating it to various positions, and therefore will not require further detail description.

From the foregoing it will be seen that the device as constructed will allow the gunner to sit behind the gun at all times to be carried around the pedestal with the turning of the gun since by reason of the special form of crooked arm ample room is provided for the gunner, as between the arm and the motorcycle. The gun is thus adapted to be used while the car is in motion, as well as when standing still, and can readily be pointed in most any direction.

Having thus described my invention what I claim and desire to secure by Letters Patent is:—

1. The combination with a motorcycle having a side car chassis, of a platform mounted thereon, a pedestal upon the platform, a supporting arm pivotally supported on the pedestal and deflected upward and outward so as to be swung over the side wheel to permit the gun to be projected in a crosswise position and a seat for the gunner.

2. The combination with the side car chassis of a motorcycle, of a platform mounted upon the chassis, a pedestal mounted thereon having a socket therein, a supporting arm adjustably mounted on the pedestal and deflected outward upward and over the side wheel, a swivel carried upon the arm and having a socket, a table and segment mounted in the socket of the swivel and adapted to also fit the socket in the pedestal.

3. The combination with a motor cycle having a side car chassis, of a platform mounted thereon, a pedestal mounted upon the platform, a block adjustably mounted upon the pedestal and located below the top of the side wheel, a supporting arm carried by the block and deflected upward and outward over the side wheel to permit the gun to be swung around into a crosswise position, and a seat attached to the block on the opposite side from the arm and arranged below the top of the side wheel.

4. The combination with the side car chassis of a motorcycle, of a platform mounted upon the chassis, a pedestal mounted thereon, a pivotal block adjustably mounted upon the base, a supporting arm adjustably mounted in the pivotal block and deflected upward and over the side wheel to clear the same when the gun is swung around into a sidewise position, a seat attached to the lower end of the arm and adapted to be adjusted therewith to and from the pivotal block.

5. The combination with the side car chassis of a motorcycle, of a pedestal mounted thereon, a pivotal block adjustably mounted upon the base, a supporting arm adjustably mounted in the pivotal block and deflected upward and over the side wheel to clear the same when the gun is swung around into a sidewise position, a seat attached to the lower end of the arm and adapted to be adjusted therewith to and from the pivotal block.

6. The combination with a motorcycle of the side car type, of a platform mounted upon the side car chassis, a pedestal mounted thereon and in line with the axis of the two wheels of the vehicle, a block adjustably mounted upon the base, a supporting arm carried by the block and deflected upward and outward to clear the side wheel and permit the gun to be swung around at a right angle, a swivel mounted upon the upper end of the arm, a table carried upon the swivel and adapted to be adjusted to various positions, and a gun mounted upon the table.

7. The combination with the side car chassis of a motorcycle, of a platform mounted upon the chassis, a pedestal mounted over the line of the axis of the rear wheels, a pivotal block adjustably mounted upon the base, a supporting arm adjustably mounted in the pivotal block and deflected upward and over the side wheel to clear the same when the gun is swung around in to a sidewise position, a seat attached to the lower end of the arm and adapted to be adjusted therewith to and from the pivotal block.

Signed at Bridgeport, in the county of Fairfield and State of Connecticut this 19th day of May, A. D. 1917.

STANLEY T. KELLOGG.

Witness:
C. M. NEWMAN.